(12) United States Patent
Hahn et al.

(10) Patent No.: US 11,211,969 B2
(45) Date of Patent: *Dec. 28, 2021

(54) ENHANCED LINEARITY MIXER

(71) Applicant: Kumu Networks, Inc., Sunnyvale, CA (US)

(72) Inventors: Wilhelm Steffen Hahn, Sunnyvale, CA (US); Alfred Riddle, Sunnyvale, CA (US); Ernie Landi, Sunnyvale, CA (US)

(73) Assignee: Kumu Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/570,272

(22) Filed: Sep. 13, 2019

(65) Prior Publication Data

US 2020/0007304 A1 Jan. 2, 2020

Related U.S. Application Data

(63) Continuation of application No. PCT/US2018/024600, filed on Mar. 27, 2018.
(Continued)

(51) Int. Cl.
*H04B 1/56* (2006.01)
*H04B 1/48* (2006.01)
(Continued)

(52) U.S. Cl.
CPC .......... *H04B 1/56* (2013.01); *H04B 1/48* (2013.01); *H04L 5/1461* (2013.01);
(Continued)

(58) Field of Classification Search
CPC ....................................................... H04B 1/56
See application file for complete search history.

(56) References Cited

U.S. PATENT DOCUMENTS

| | | |
|---|---|---|
| 3,922,617 A | 11/1975 | Denniston et al. |
| 4,321,624 A | 3/1982 | Gibson et al. |

(Continued)

FOREIGN PATENT DOCUMENTS

| | | |
|---|---|---|
| EP | 0755141 A3 | 10/1998 |
| EP | 1959625 B1 | 2/2009 |

(Continued)

OTHER PUBLICATIONS

International Search Report and Written Opinion for International Application No. PCT/US18/24577.
(Continued)

*Primary Examiner* — Kodzovi Acolatse
*Assistant Examiner* — Abdeltif Ajid
(74) *Attorney, Agent, or Firm* — Jeffrey Schox; Samuel Rosenthal

(57) ABSTRACT

A system for enhanced linearity mixing includes an input-source signal coupler; a local oscillator (LO) signal coupler; a primary mixer that combines, via heterodyning, the primary-mixer-input signal and the primary-mixer-LO signal to generate a primary-mixer-output signal; a distortion-source mixer that combines, via heterodyning, the distortion-mixer-input signal and the distortion-mixer-LO signal to generate a distortion-mixer-output signal; and an output signal coupler that combines the primary-mixer-output signal and the distortion-mixer-output signal to generate an output signal with reduced non-linearity.

23 Claims, 7 Drawing Sheets

Related U.S. Application Data

(60) Provisional application No. 62/477,346, filed on Mar. 27, 2017, provisional application No. 62/598,739, filed on Dec. 14, 2017.

(51) Int. Cl.
*H04L 5/14* (2006.01)
*H04B 1/00* (2006.01)

(52) U.S. Cl.
CPC .............. *H04B 1/0075* (2013.01); *H04L 5/14* (2013.01); *H04L 5/1423* (2013.01)

(56) References Cited

U.S. PATENT DOCUMENTS

| | | |
|---|---|---|
| 4,952,193 A | 8/1990 | Talwar |
| 5,212,827 A | 5/1993 | Meszko et al. |
| 5,691,978 A | 11/1997 | Kenworthy |
| 5,734,967 A | 3/1998 | Kotzin et al. |
| 5,790,658 A | 8/1998 | Yip et al. |
| 5,818,385 A | 10/1998 | Bartholomew |
| 5,930,301 A | 7/1999 | Chester et al. |
| 6,215,812 B1 | 4/2001 | Young et al. |
| 6,240,150 B1 | 5/2001 | Darveau et al. |
| 6,411,250 B1 | 6/2002 | Oswald et al. |
| 6,539,204 B1 | 3/2003 | Marsh et al. |
| 6,567,649 B2 | 5/2003 | Souissi |
| 6,580,771 B2 | 6/2003 | Kenney |
| 6,639,551 B2 | 10/2003 | Li et al. |
| 6,657,950 B1 | 12/2003 | Jones et al. |
| 6,686,879 B2 | 2/2004 | Shattil |
| 6,725,017 B2 | 4/2004 | Blount et al. |
| 6,907,093 B2 | 6/2005 | Blount et al. |
| 6,915,112 B1 | 7/2005 | Sutton et al. |
| 6,965,657 B1 | 11/2005 | Rezvani et al. |
| 6,985,705 B2 | 1/2006 | Shohara |
| 7,057,472 B2 | 6/2006 | Fukamachi et al. |
| 7,110,381 B1 | 9/2006 | OSullivan et al. |
| 7,139,543 B2 | 11/2006 | Shah |
| 7,177,341 B2 | 2/2007 | McCorkle |
| 7,228,104 B2 | 6/2007 | Collins et al. |
| 7,266,358 B2 | 9/2007 | Hillstrom |
| 7,302,024 B2 | 11/2007 | Arambepola |
| 7,336,128 B2 | 2/2008 | Suzuki et al. |
| 7,336,940 B2 | 2/2008 | Smithson |
| 7,348,844 B2 | 3/2008 | Jaenecke |
| 7,349,505 B2 | 3/2008 | Blount et al. |
| 7,362,257 B2 | 4/2008 | Bruzzone et al. |
| 7,372,420 B1 | 5/2008 | Osterhues et al. |
| 7,397,843 B2 | 7/2008 | Grant et al. |
| 7,426,242 B2 | 9/2008 | Thesling |
| 7,483,683 B1 * | 1/2009 | Wong .................. H03D 7/14 455/130 |
| 7,508,898 B2 | 3/2009 | Cyr et al. |
| 7,509,100 B2 | 3/2009 | Toncich |
| 7,706,755 B2 | 4/2010 | Muhammad et al. |
| 7,733,813 B2 | 6/2010 | Shin et al. |
| 7,773,759 B2 | 8/2010 | Alves et al. |
| 7,773,950 B2 | 8/2010 | Wang et al. |
| 7,778,611 B2 | 8/2010 | Asai et al. |
| 7,869,527 B2 | 1/2011 | Vetter et al. |
| 7,948,878 B2 | 5/2011 | Briscoe et al. |
| 7,962,170 B2 | 6/2011 | Axness et al. |
| 7,987,363 B2 | 7/2011 | Chauncey et al. |
| 7,999,715 B2 | 8/2011 | Yamaki et al. |
| 8,005,235 B2 | 8/2011 | Rebandt et al. |
| 8,023,438 B2 | 9/2011 | Kangasmaa et al. |
| 8,027,642 B2 | 9/2011 | Proctor et al. |
| 8,031,744 B2 | 10/2011 | Radunovic et al. |
| 8,032,183 B2 | 10/2011 | Rudrapatna |
| 8,036,606 B2 | 10/2011 | Kenington |
| 8,055,235 B1 | 11/2011 | Gupta et al. |
| 8,060,803 B2 | 11/2011 | Kim |
| 8,081,695 B2 | 12/2011 | Chrabieh et al. |
| 8,085,831 B2 | 12/2011 | Teague |
| 8,086,191 B2 | 12/2011 | Fukuda et al. |
| 8,090,320 B2 | 1/2012 | Dent et al. |
| 8,155,046 B2 | 4/2012 | Jung et al. |
| 8,155,595 B2 | 4/2012 | Sahin et al. |
| 8,160,176 B2 | 4/2012 | Dent et al. |
| 8,175,535 B2 | 5/2012 | Mu |
| 8,179,990 B2 | 5/2012 | Orlik et al. |
| 8,218,697 B2 | 7/2012 | Guess et al. |
| 8,270,456 B2 | 9/2012 | Leach et al. |
| 8,274,342 B2 | 9/2012 | Tsutsumi et al. |
| 8,306,480 B2 | 11/2012 | Muhammad et al. |
| 8,331,477 B2 | 12/2012 | Huang et al. |
| 8,349,933 B2 | 1/2013 | Bhandari et al. |
| 8,351,533 B2 | 1/2013 | Shrivastava et al. |
| 8,385,855 B2 | 2/2013 | Lorg et al. |
| 8,385,871 B2 | 2/2013 | Wyville |
| 8,391,878 B2 | 3/2013 | Tenny |
| 8,417,750 B2 | 4/2013 | Yan et al. |
| 8,422,412 B2 | 4/2013 | Hahn |
| 8,422,540 B1 | 4/2013 | Negus et al. |
| 8,428,542 B2 | 4/2013 | Bornazyan |
| 8,446,892 B2 | 5/2013 | Ji et al. |
| 8,457,549 B2 | 6/2013 | Weng et al. |
| 8,462,697 B2 | 6/2013 | Park et al. |
| 8,467,757 B2 | 6/2013 | Ahn |
| 8,498,585 B2 | 7/2013 | Vandenameele |
| 8,502,924 B2 | 8/2013 | Liou et al. |
| 8,509,129 B2 | 8/2013 | Deb et al. |
| 8,521,090 B2 | 8/2013 | Kim et al. |
| 8,576,752 B2 | 11/2013 | Sarca |
| 8,611,401 B2 | 12/2013 | Lakkis |
| 8,619,916 B2 | 12/2013 | Jong |
| 8,625,686 B2 | 1/2014 | Li et al. |
| 8,626,090 B2 | 1/2014 | Dalipi |
| 8,649,417 B2 | 2/2014 | Baldemair et al. |
| 8,711,943 B2 | 4/2014 | Rossato et al. |
| 8,743,674 B2 | 6/2014 | Parnaby et al. |
| 8,744,377 B2 | 6/2014 | Rimini et al. |
| 8,750,786 B2 | 6/2014 | Larsson et al. |
| 8,755,756 B1 | 6/2014 | Zhang et al. |
| 8,767,869 B2 | 7/2014 | Rimini et al. |
| 8,787,907 B2 | 7/2014 | Jain et al. |
| 8,798,177 B2 | 8/2014 | Park et al. |
| 8,804,975 B2 | 8/2014 | Harris et al. |
| 8,837,332 B2 | 9/2014 | Khojastepour et al. |
| 8,842,584 B2 | 9/2014 | Jana et al. |
| 8,879,433 B2 | 11/2014 | Khojastepour et al. |
| 8,879,811 B2 | 11/2014 | Liu et al. |
| 8,913,528 B2 | 12/2014 | Cheng et al. |
| 8,929,550 B2 | 1/2015 | Shattil et al. |
| 8,937,874 B2 | 1/2015 | Gainey et al. |
| 8,942,314 B2 | 1/2015 | Aparin |
| 8,958,769 B1 | 2/2015 | Razzell |
| 8,995,410 B2 | 3/2015 | Balan et al. |
| 8,995,932 B2 | 3/2015 | Wyville |
| 9,014,069 B2 | 4/2015 | Patil et al. |
| 9,019,849 B2 | 4/2015 | Hui et al. |
| 9,031,567 B2 | 5/2015 | Haub |
| 9,042,838 B2 | 5/2015 | Braithwaite |
| 9,054,795 B2 | 6/2015 | Choi et al. |
| 9,065,519 B2 | 6/2015 | Cyzs et al. |
| 9,077,421 B1 | 7/2015 | Mehlman et al. |
| 9,112,476 B2 | 8/2015 | Basaran et al. |
| 9,124,475 B2 | 9/2015 | Li et al. |
| 9,130,747 B2 | 9/2015 | Zinser et al. |
| 9,136,883 B1 | 9/2015 | Moher et al. |
| 9,160,430 B2 | 10/2015 | Maltsev et al. |
| 9,184,902 B2 | 11/2015 | Khojastepour et al. |
| 9,185,711 B2 | 11/2015 | Lin et al. |
| 9,231,647 B2 | 1/2016 | Polydoros et al. |
| 9,231,712 B2 | 1/2016 | Hahn et al. |
| 9,236,996 B2 | 1/2016 | Khandani |
| 9,247,647 B1 * | 1/2016 | Yoon .................. H05K 1/116 |
| 9,264,024 B2 | 2/2016 | Shin et al. |
| 9,312,895 B1 | 4/2016 | Gupta et al. |
| 9,325,432 B2 | 4/2016 | Hong et al. |
| 9,331,737 B2 | 5/2016 | Hong et al. |
| 9,413,500 B2 | 8/2016 | Chincholi et al. |
| 9,413,516 B2 | 8/2016 | Khandani |

(56) References Cited

U.S. PATENT DOCUMENTS

| | | |
|---|---|---|
| 9,455,756 B2 | 9/2016 | Choi et al. |
| 9,461,698 B2 | 10/2016 | Moffatt et al. |
| 9,479,198 B2 | 10/2016 | Moher et al. |
| 9,490,918 B2 | 11/2016 | Negus et al. |
| 9,490,963 B2 | 11/2016 | Choi et al. |
| 9,537,543 B2 | 1/2017 | Choi |
| 9,559,734 B2 | 1/2017 | Hwang et al. |
| 9,621,221 B2 | 4/2017 | Hua et al. |
| 9,742,593 B2 | 8/2017 | Moorti et al. |
| 9,800,207 B2 * | 10/2017 | Datta ................ H03F 3/72 |
| 10,491,313 B2 | 11/2019 | Jain et al. |
| 2002/0034191 A1 | 3/2002 | Shattil |
| 2002/0064245 A1 | 5/2002 | McCorkle |
| 2002/0072344 A1 | 6/2002 | Souissi |
| 2002/0109631 A1 | 8/2002 | Li et al. |
| 2002/0154717 A1 | 10/2002 | Shima et al. |
| 2002/0172265 A1 | 11/2002 | Kenney |
| 2003/0031279 A1 | 2/2003 | Blount et al. |
| 2003/0099287 A1 | 5/2003 | Arambepola |
| 2003/0104787 A1 | 6/2003 | Blount et al. |
| 2003/0109238 A1 * | 6/2003 | Kim ................ H03D 7/1491 455/293 |
| 2003/0148748 A1 | 8/2003 | Shah |
| 2004/0021494 A1 | 2/2004 | Kim |
| 2004/0106381 A1 | 6/2004 | Tiller |
| 2004/0171351 A1 | 9/2004 | Nakazawa et al. |
| 2004/0266378 A1 | 12/2004 | Fukamachi et al. |
| 2005/0030888 A1 | 2/2005 | Thesling |
| 2005/0078743 A1 | 4/2005 | Shohara |
| 2005/0101267 A1 | 5/2005 | Smithson |
| 2005/0129152 A1 | 6/2005 | Hillstrom |
| 2005/0159128 A1 | 7/2005 | Collins et al. |
| 2005/0190870 A1 | 9/2005 | Blount et al. |
| 2005/0250466 A1 | 11/2005 | Varma et al. |
| 2005/0254555 A1 | 11/2005 | Teague |
| 2005/0282500 A1 | 12/2005 | Wang et al. |
| 2006/0029124 A1 | 2/2006 | Grant et al. |
| 2006/0030277 A1 | 2/2006 | Cyr et al. |
| 2006/0058022 A1 | 3/2006 | Webster et al. |
| 2006/0061691 A1 | 3/2006 | Rabinowitz et al. |
| 2006/0083297 A1 | 4/2006 | Yan et al. |
| 2006/0209754 A1 | 9/2006 | Ji et al. |
| 2006/0240769 A1 | 10/2006 | Proctor et al. |
| 2006/0273853 A1 | 12/2006 | Suzuki et al. |
| 2007/0018722 A1 | 1/2007 | Jaenecke |
| 2007/0105509 A1 | 5/2007 | Muhammad et al. |
| 2007/0207747 A1 | 9/2007 | Johnson et al. |
| 2007/0207748 A1 | 9/2007 | Toncich |
| 2007/0219739 A1 | 9/2007 | Spears et al. |
| 2007/0249314 A1 | 10/2007 | Sanders et al. |
| 2007/0263748 A1 | 11/2007 | Mesecher |
| 2007/0274372 A1 | 11/2007 | Asai et al. |
| 2007/0283220 A1 | 12/2007 | Kim |
| 2007/0296625 A1 | 12/2007 | Bruzzone et al. |
| 2008/0037801 A1 | 2/2008 | Alves et al. |
| 2008/0089397 A1 | 4/2008 | Vetter et al. |
| 2008/0107046 A1 | 5/2008 | Kangasmaa et al. |
| 2008/0111754 A1 | 5/2008 | Osterhues et al. |
| 2008/0131133 A1 | 6/2008 | Blunt et al. |
| 2008/0144852 A1 | 6/2008 | Rebandt et al. |
| 2008/0192636 A1 | 8/2008 | Briscoe et al. |
| 2008/0219339 A1 | 9/2008 | Chrabieh et al. |
| 2008/0219377 A1 | 9/2008 | Nisbet |
| 2008/0279122 A1 | 11/2008 | Fukuda et al. |
| 2008/0311860 A1 | 12/2008 | Tanaka et al. |
| 2009/0022089 A1 | 1/2009 | Rudrapatna |
| 2009/0034437 A1 | 2/2009 | Shin et al. |
| 2009/0047914 A1 | 2/2009 | Axness et al. |
| 2009/0115912 A1 | 5/2009 | Liou et al. |
| 2009/0180404 A1 | 7/2009 | Jung et al. |
| 2009/0186582 A1 | 7/2009 | Muhammad et al. |
| 2009/0213770 A1 | 8/2009 | Mu |
| 2009/0221231 A1 | 9/2009 | Murch et al. |
| 2009/0262852 A1 | 10/2009 | Orlik et al. |
| 2009/0303908 A1 | 12/2009 | Deb et al. |
| 2010/0014600 A1 | 1/2010 | Li et al. |
| 2010/0014614 A1 | 1/2010 | Leach et al. |
| 2010/0022201 A1 | 1/2010 | Vandenameele |
| 2010/0031036 A1 | 2/2010 | Chauncey et al. |
| 2010/0056166 A1 | 3/2010 | Tenny |
| 2010/0081408 A1 | 4/2010 | Mu et al. |
| 2010/0103900 A1 | 4/2010 | Ahn et al. |
| 2010/0117693 A1 | 5/2010 | Buer et al. |
| 2010/0120390 A1 | 5/2010 | Panikkath et al. |
| 2010/0136900 A1 | 6/2010 | Seki |
| 2010/0150032 A1 | 6/2010 | Zinser et al. |
| 2010/0150033 A1 | 6/2010 | Zinser et al. |
| 2010/0150070 A1 | 6/2010 | Chae et al. |
| 2010/0159858 A1 | 6/2010 | Dent et al. |
| 2010/0197231 A1 | 8/2010 | Kenington |
| 2010/0208854 A1 | 8/2010 | Guess et al. |
| 2010/0215124 A1 | 8/2010 | Zeong et al. |
| 2010/0226356 A1 | 9/2010 | Sahin et al. |
| 2010/0226416 A1 | 9/2010 | Dent et al. |
| 2010/0226448 A1 | 9/2010 | Dent |
| 2010/0232324 A1 | 9/2010 | Radunovic et al. |
| 2010/0266057 A1 | 10/2010 | Shrivastava et al. |
| 2010/0272289 A1 | 10/2010 | Kornagel et al. |
| 2010/0277289 A1 | 11/2010 | Brauner et al. |
| 2010/0278085 A1 | 11/2010 | Hahn |
| 2010/0279602 A1 | 11/2010 | Larsson et al. |
| 2010/0284447 A1 | 11/2010 | Gore et al. |
| 2010/0295716 A1 | 11/2010 | Yamaki et al. |
| 2011/0013684 A1 | 1/2011 | Semenov et al. |
| 2011/0013735 A1 | 1/2011 | Huang et al. |
| 2011/0026509 A1 | 2/2011 | Tanaka |
| 2011/0081880 A1 | 4/2011 | Ahn |
| 2011/0149714 A1 | 6/2011 | Rimini et al. |
| 2011/0171922 A1 | 7/2011 | Kim et al. |
| 2011/0216813 A1 | 9/2011 | Baldemair et al. |
| 2011/0222631 A1 | 9/2011 | Jong |
| 2011/0227664 A1 | 9/2011 | Wyville |
| 2011/0243202 A1 | 10/2011 | Lakkis |
| 2011/0250858 A1 | 10/2011 | Jain et al. |
| 2011/0254639 A1 | 10/2011 | Tsutsumi et al. |
| 2011/0256857 A1 | 10/2011 | Chen et al. |
| 2011/0268232 A1 | 11/2011 | Park et al. |
| 2011/0311067 A1 | 12/2011 | Harris et al. |
| 2011/0319044 A1 | 12/2011 | Bornazyan |
| 2012/0007651 A1 | 1/2012 | Meng et al. |
| 2012/0021153 A1 | 1/2012 | Bhandari et al. |
| 2012/0052892 A1 | 3/2012 | Braithwaite |
| 2012/0063369 A1 | 3/2012 | Lin et al. |
| 2012/0063373 A1 | 3/2012 | Chincholi et al. |
| 2012/0140685 A1 | 6/2012 | Lederer et al. |
| 2012/0140860 A1 | 6/2012 | Rimini et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0201153 A1 | 8/2012 | Bharadia et al. |
| 2012/0201173 A1 | 8/2012 | Jain et al. |
| 2012/0224497 A1 | 9/2012 | Lindoff et al. |
| 2013/0005284 A1 | 1/2013 | Dalipi |
| 2013/0040555 A1 | 2/2013 | Rimini et al. |
| 2013/0044791 A1 | 2/2013 | Rimini et al. |
| 2013/0077502 A1 | 3/2013 | Gainey et al. |
| 2013/0089009 A1 | 4/2013 | Li et al. |
| 2013/0102254 A1 | 4/2013 | Cyzs et al. |
| 2013/0114468 A1 | 5/2013 | Hui et al. |
| 2013/0120190 A1 | 5/2013 | Mccune |
| 2013/0142030 A1 | 6/2013 | Parnaby et al. |
| 2013/0155913 A1 | 6/2013 | Sarca |
| 2013/0166259 A1 | 6/2013 | Weber et al. |
| 2013/0194984 A1 | 8/2013 | Cheng et al. |
| 2013/0215805 A1 | 8/2013 | Hong et al. |
| 2013/0225101 A1 | 8/2013 | Basaran et al. |
| 2013/0253917 A1 | 9/2013 | Schildbach |
| 2013/0259343 A1 | 10/2013 | Liu et al. |
| 2013/0286903 A1 | 10/2013 | Khojastepour et al. |
| 2013/0294523 A1 | 11/2013 | Rossato et al. |
| 2013/0301487 A1 | 11/2013 | Khandani |
| 2013/0301488 A1 | 11/2013 | Hong et al. |
| 2013/0308717 A1 | 11/2013 | Maltsev et al. |

(56) References Cited

U.S. PATENT DOCUMENTS

| | | |
|---|---|---|
| 2013/0315211 A1 | 11/2013 | Balan et al. |
| 2014/0011461 A1 | 1/2014 | Bakalski et al. |
| 2014/0016515 A1 | 1/2014 | Jana et al. |
| 2014/0030996 A1* | 1/2014 | Gan .................... H03D 7/1458 455/326 |
| 2014/0036736 A1 | 2/2014 | Wyville |
| 2014/0072072 A1 | 3/2014 | Ismail et al. |
| 2014/0126437 A1 | 5/2014 | Patil et al. |
| 2014/0140250 A1 | 5/2014 | Kim et al. |
| 2014/0169236 A1 | 6/2014 | Choi et al. |
| 2014/0185533 A1 | 7/2014 | Haub |
| 2014/0194073 A1 | 7/2014 | Wyville et al. |
| 2014/0206300 A1 | 7/2014 | Hahn et al. |
| 2014/0219139 A1 | 8/2014 | Choi et al. |
| 2014/0219449 A1 | 8/2014 | Shattil et al. |
| 2014/0232468 A1 | 8/2014 | Hulbert |
| 2014/0235191 A1 | 8/2014 | Mikhemar et al. |
| 2014/0269991 A1 | 9/2014 | Aparin |
| 2014/0313946 A1 | 10/2014 | Azadet |
| 2014/0348018 A1 | 11/2014 | Bharadia et al. |
| 2014/0348032 A1 | 11/2014 | Hua et al. |
| 2014/0349595 A1 | 11/2014 | Cox |
| 2014/0349716 A1 | 11/2014 | Axholt |
| 2014/0376416 A1 | 12/2014 | Choi |
| 2015/0049834 A1 | 2/2015 | Choi et al. |
| 2015/0094008 A1 | 4/2015 | Maxim et al. |
| 2015/0103745 A1 | 4/2015 | Negus et al. |
| 2015/0139122 A1 | 5/2015 | Rimini et al. |
| 2015/0146765 A1 | 5/2015 | Moffatt et al. |
| 2015/0156003 A1 | 6/2015 | Khandani |
| 2015/0156004 A1 | 6/2015 | Khandani |
| 2015/0171903 A1 | 6/2015 | Mehlman et al. |
| 2015/0180522 A1 | 6/2015 | Wyville |
| 2015/0188646 A1 | 7/2015 | Bharadia et al. |
| 2015/0215937 A1 | 7/2015 | Khandani |
| 2015/0249444 A1 | 9/2015 | Shin et al. |
| 2015/0256210 A1 | 9/2015 | Nilsson |
| 2015/0270865 A1 | 9/2015 | Polydoros et al. |
| 2015/0280893 A1 | 10/2015 | Choi et al. |
| 2015/0303984 A1 | 10/2015 | Braithwaite |
| 2015/0311928 A1 | 10/2015 | Chen et al. |
| 2015/0333847 A1 | 11/2015 | Bharadia et al. |
| 2016/0043759 A1 | 2/2016 | Choi et al. |
| 2016/0056846 A1 | 2/2016 | Moher et al. |
| 2016/0105213 A1 | 4/2016 | Hua et al. |
| 2016/0119019 A1 | 4/2016 | Pratt |
| 2016/0119020 A1 | 4/2016 | Charlon |
| 2016/0126894 A1 | 5/2016 | Lakdawala et al. |
| 2016/0127113 A1 | 5/2016 | Khandani |
| 2016/0182097 A1 | 6/2016 | Jiang et al. |
| 2016/0218769 A1 | 7/2016 | Chang et al. |
| 2016/0226653 A1 | 8/2016 | Bharadia et al. |
| 2016/0266245 A1 | 9/2016 | Bharadia et al. |
| 2016/0269061 A1 | 9/2016 | Hwang et al. |
| 2016/0285484 A1 | 9/2016 | Weissman et al. |
| 2016/0285486 A1 | 9/2016 | Qin et al. |
| 2016/0294425 A1 | 10/2016 | Hwang et al. |
| 2016/0315754 A1 | 10/2016 | Wu et al. |
| 2016/0344432 A1 | 11/2016 | Hwang et al. |
| 2016/0380706 A1 | 12/2016 | Tanzi et al. |
| 2017/0005773 A1 | 1/2017 | Liu et al. |
| 2017/0041095 A1 | 2/2017 | Hwang et al. |
| 2017/0170948 A1 | 6/2017 | Eltawil et al. |
| 2017/0187513 A9 | 6/2017 | Bharadia et al. |
| 2017/0366138 A1 | 12/2017 | Mu et al. |
| 2018/0063745 A1 | 3/2018 | Jain et al. |
| 2018/0227925 A1 | 8/2018 | Gebhard |
| 2018/0316482 A1 | 11/2018 | Gudovskiy et al. |
| 2019/0158193 A1 | 5/2019 | Jain et al. |
| 2019/0204413 A1 | 7/2019 | Jaeger et al. |
| 2019/0372533 A1 | 12/2019 | Huang et al. |
| 2020/0382170 A1 | 12/2020 | Lang et al. |

FOREIGN PATENT DOCUMENTS

| | | | |
|---|---|---|---|
| EP | 2237434 A1 | 10/2010 | |
| EP | 2267946 A2 | 12/2010 | |
| JP | S61184908 A | 8/1986 | |
| JP | H01176105 A | 7/1989 | |
| JP | H0595230 A | 4/1993 | |
| JP | 2000236221 A | 8/2000 | |
| JP | 2003017944 A | 1/2003 | |
| RU | 2256985 C2 | 7/2005 | |
| WO | WO-9938253 A1 * | 7/1999 | ............ H03D 7/165 |
| WO | 2013173250 A1 | 11/2013 | |
| WO | 2013185106 A1 | 12/2013 | |
| WO | 2014093916 A1 | 6/2014 | |

OTHER PUBLICATIONS

International Search Report and Written Opinion for International Application No. PCT/US18/24600 dated Jun. 14, 2018.

"Bharadia et al., "Full Duplex Radios" SIGOMM, Aug. 12-16, 2013, Hong Kong, China, Copyright 2013 ACM 978-1-4503-2056-6/6/13/08, 12 pages."

"Mcmichael et al., "Optimal Tuning of Analog Self-Interference Cancellers for Full-Duple Wireless Communication", Oct. 1-5, 2012, Fiftieth Annual Allerton Conference, Illinois, USA, pp. 246-251 ", Jun. 1, 2017 00:00:00.0.

* cited by examiner

ENHANCED LINEARITY MIXER

CROSS-REFERENCE TO RELATED APPLICATIONS

This application is a continuation of PCT Application serial number PCT/US18/24600, filed on 27 Mar. 2018, which claims the benefit of U.S. Provisional Application Ser. No. 62/477,346, filed on 27 Mar. 2017 and of U.S. Provisional Application Ser. No. 62/598,739, filed on 14 Dec. 2017, all of which are incorporated in their entireties by this reference.

TECHNICAL FIELD

This invention relates generally to the analog circuit field, and more specifically to new and useful systems and methods for enhanced linearity frequency mixing.

BACKGROUND

Traditional wireless communication systems are half-duplex; that is, they are not capable of transmitting and receiving signals simultaneously on a single wireless communications channel. Recent work in the wireless communications field has led to advancements in developing full-duplex wireless communications systems; these systems, if implemented successfully, could provide enormous benefit to the wireless communications field. For example, the use of full-duplex communications by cellular networks could cut spectrum needs in half. One major roadblock to successful implementation of full-duplex communications is the problem of self-interference.

Many solutions to address self-interference rely on mixing circuits (e.g., as part of an analog self-interference canceller), but these solutions may suffer in performance due to constraints inherent in traditional frequency mixers. Thus, there is a need in the wireless communications field to create new and useful systems and methods for enhanced linearity frequency mixing. This invention provides such new and useful systems and methods.

Of course, such systems and methods for enhanced linearity frequency mixing may find use in a wide variety of applications in analog circuits.

DESCRIPTION OF THE INVENTION EMBODIMENTS

Figure 1:
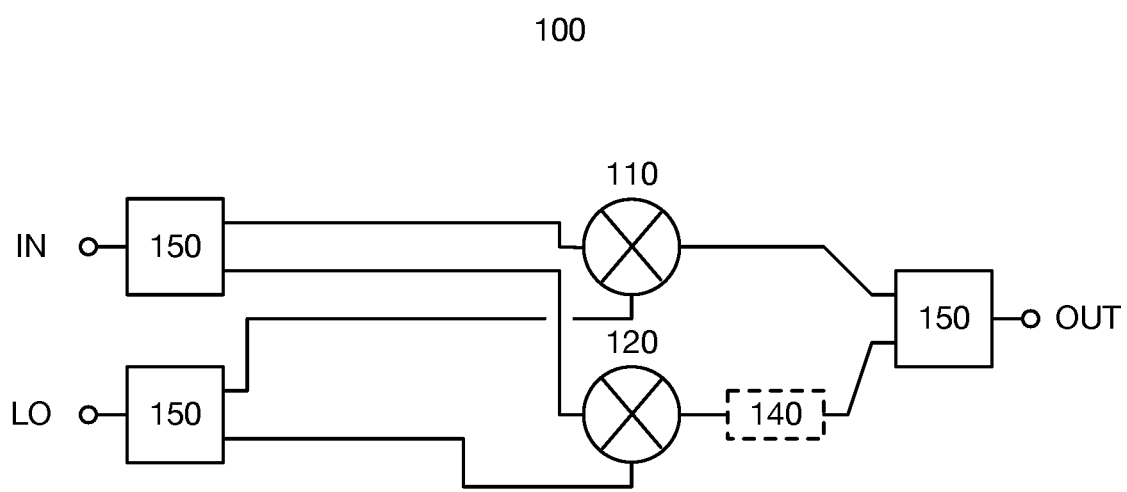
FIG. 1 is a diagram view of a system of an invention embodiment.

The following description of the invention embodiments of the invention is not intended to limit the invention to these invention embodiments, but rather to enable any person skilled in the art to make and use this invention.

1. Full-Duplex Wireless Communication Systems

Wireless communications systems have revolutionized the way the world communicates, and the rapid growth of communication using such systems has provided increased economic and educational opportunity across all regions and industries. Unfortunately, the wireless spectrum required for communication is a finite resource, and the rapid growth in wireless communications has also made the availability of this resource ever scarcer. As a result, spectral efficiency has become increasingly important to wireless communications systems.

One promising solution for increasing spectral efficiency is found in full-duplex wireless communications systems; that is, wireless communications systems that are able to transmit and receive wireless signals at the same time on the same wireless channel. This technology allows for a doubling of spectral efficiency compared to standard half-duplex wireless communications systems.

While full-duplex wireless communications systems have substantial value to the wireless communications field, such systems have been known to face challenges due to self-interference; because reception and transmission occur at the same time on the same channel, the received signal at a full-duplex transceiver may include undesired signal components from the signal being transmitted from that transceiver. As a result, full-duplex wireless communications systems often include analog and/or digital self-interference cancellation circuits to reduce self-interference.

Full-duplex transceivers preferably sample transmission output as baseband digital signals, intermediate frequency (IF) analog signals, or as radio-frequency (RF) analog signals, but full-duplex transceivers may additionally or alternatively sample transmission output in any suitable manner (e.g., as IF digital signals). This sampled transmission output may be used by full-duplex transceivers to remove interference from received wireless communications data (e.g., as RF/IF analog signals or baseband digital signals). In many full-duplex transceivers, an analog self-interference cancellation system is paired with a digital self-interference cancellation system. The analog self-interference cancellation system removes a first portion of self-interference by summing delayed, phase shifted and scaled versions of the RF transmit signal to create an RF self-interference cancellation signal, which is then subtracted from the RF receive signal. Alternatively, the analog cancellation system may perform similar tasks at an intermediate frequency. After the RF (or IF) receive signal has the RF/IF self-interference cancellation signal subtracted, it passes through an analog-to-digital converter of the receiver (and becomes a digital receive signal). After this stage, a digital self-interference cancellation signal (created by transforming a digital transmit signal) is then subtracted from the digital receive signal.

The systems and methods described herein may increase performance of full-duplex transceivers (and other applicable systems) by enabling high linearity frequency mixing without prohibitive increases in circuit complexity and/or cost. Other applicable systems include active sensing systems (e.g., RADAR), wired communications systems, wireless communications systems, channel emulators, reflectometers, PIM analyzers and/or any other systems featuring analog electronics, including communication systems where transmit and receive bands are close in frequency, but not overlapping.

2. System for Enhanced Linearity Mixing

A system 100 for enhanced linearity mixing includes a primary mixer 110, a distortion-source mixer 120, and signal couplers 150, as shown in FIG. 1. The system Dm may additionally include a phase shifter 130, a scaler 140, and/or harmonic shorting circuits 160.

The system 100 functions to improve the linearity of frequency mixers (or more generally, circuits and line-ups including frequency mixers). High linearity circuits are important for a large variety of analog electronic systems, particularly in communications systems. Traditionally, analog circuit designers can improve linearity by sourcing higher linearity components (which can incur significant cost), reducing power levels (which may have negative consequences for signal-to-noise levels or otherwise), or by substantially increasing circuit complexity and power consumption.

Operating on a general principle similar to the self-interference cancellation techniques discussed in Section 1, the system 100 utilizes components (e.g., the distortion-source mixer 120) to model and subtract distortion present in the output of the primary mixer 110 (or a more general circuit including the primary mixer 110), thus creating a more linear output of the system 100 than that of the primary mixer 110 alone.

The primary mixer 110 functions to convert an input signal from a first frequency to a second frequency; e.g., from radio frequency (RF) to intermediate frequency (IF) or baseband, or from baseband to RF or IF, or from IF to baseband or RF.

The primary mixer 110 is preferably an active mixer, but may additionally or alternatively be a passive mixer. The primary mixer 110 may comprise discrete components, analog integrated circuits (ICs), digital ICs, and/or any other suitable components. The primary mixer 110 preferably functions to combine two or more electrical input signals into one or more composite outputs, where each output includes some characteristics of at least two input signals.

The primary mixer 110 preferably takes in an input signal as well as a frequency shift signal, preferably provided by a local oscillator (LO). The local oscillator is preferably a PLL (Phase Locked Loop) steered digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

Given an input signal centered at frequency f1 and frequency shift signal at frequency f2, the primary mixer 110 may produce output signals (each a product of the input signal and the frequency shift signal) at each of the following frequencies: $f=nf_1+mf_2$, where n and m are integers. Take, for example, that f1 is 900 MHz, f2 is 750 MHz, and the desired output frequency is 150 MHz. In this example, the problematic outputs are those around 150 MHz, other from the primary output that is at $f_1-f_2$. In this example, the outputs other than the primary output that are near the desired frequency are at $\{\{n, m\}\}=\{\{-4, 5\}, \{6, -7\}\}$ (which are, for most mixers, almost non-existent).

Unfortunately, the situation is more complicated when the primary mixer no encounters multiple closely spaced signals simultaneously (as is common in communications). Now assume two input signals at f1 and f2, and frequency shift at f3; now products can be produced at all $f=nf_1+mf_2+of_3$. Assuming now that f1 is 900.00 MHz, f2 is 900.050 MHz, f3 is 750 MHz, and the desired output frequencies are 150.000 and 150.050 MHz. Now, there are troubling outputs: $\{\{n, m, o\}\}=\{\{2, -1, -1\}, \{-1, 2, -1\}\}$ (third order terms), $\{\{n, m, o\}\}=\{\{3, -2, -1\}, \{-2, 3, -1\}\}$ (fifth order terms), and $\{\{n, m, o\}\}=\{\{4, -3, -1\}, \{-3, 4, -1\}\}$ (seventh order terms). These outputs are as shown in FIG. 2.

Figure 2:
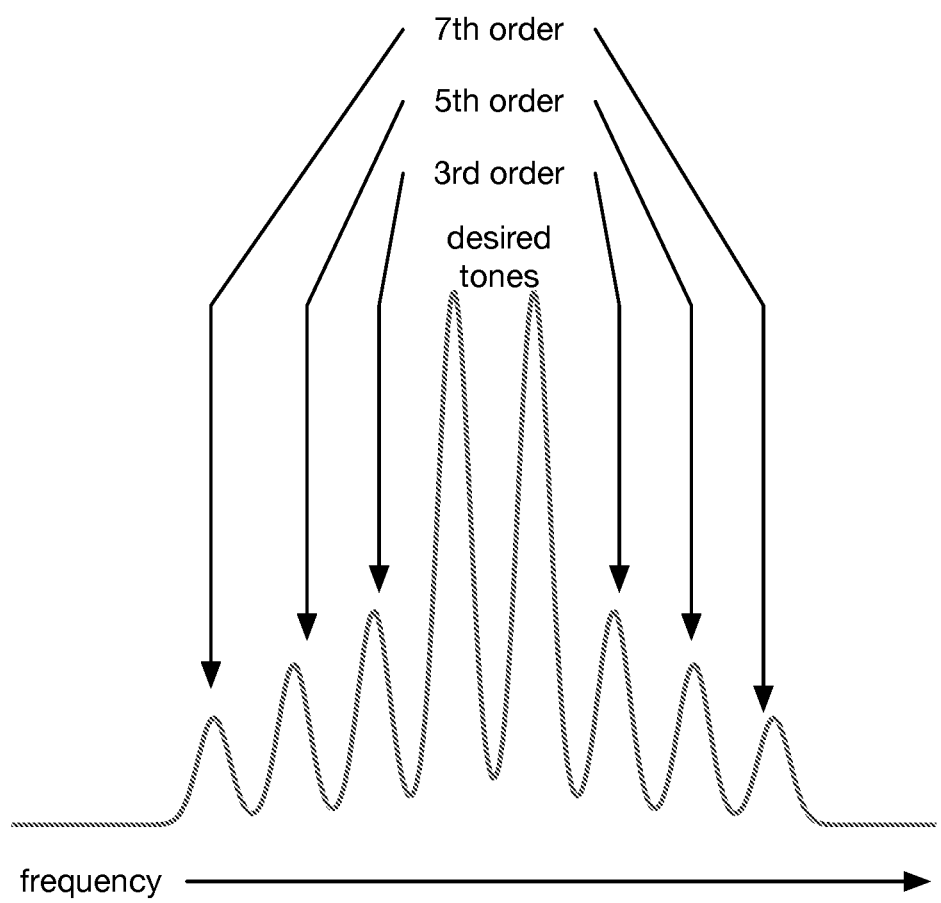
FIG. 2 is an example graph view of an output signal of a mixer.

The distortion-source mixer 120 functions to model the distortion of the primary mixer 110 (e.g., as shown in FIG. 2). This output of the distortion-source mixer 120 may then be subtracted from that of the primary mixer no, reducing the distortion present in the output of the primary mixer no.

The distortion present in the output of the primary mixer 110 is reduced because the signal power ratio of first order components to higher order components (i.e., components of order >1, also referred to as non-linear components) in the distortion mixer output is preferably higher than in the primary mixer output, so subtracting the distortion mixer output from the primary mixer output reduces higher order components more than it reduces first order components.

The distortion-source mixer 120 is preferably substantially similar to the primary mixer 110, but the distortion-source mixer 120 may be a mixer with different fundamental characteristics than the primary mixer 110 (alternatively, they may be the same).

Figure 3:
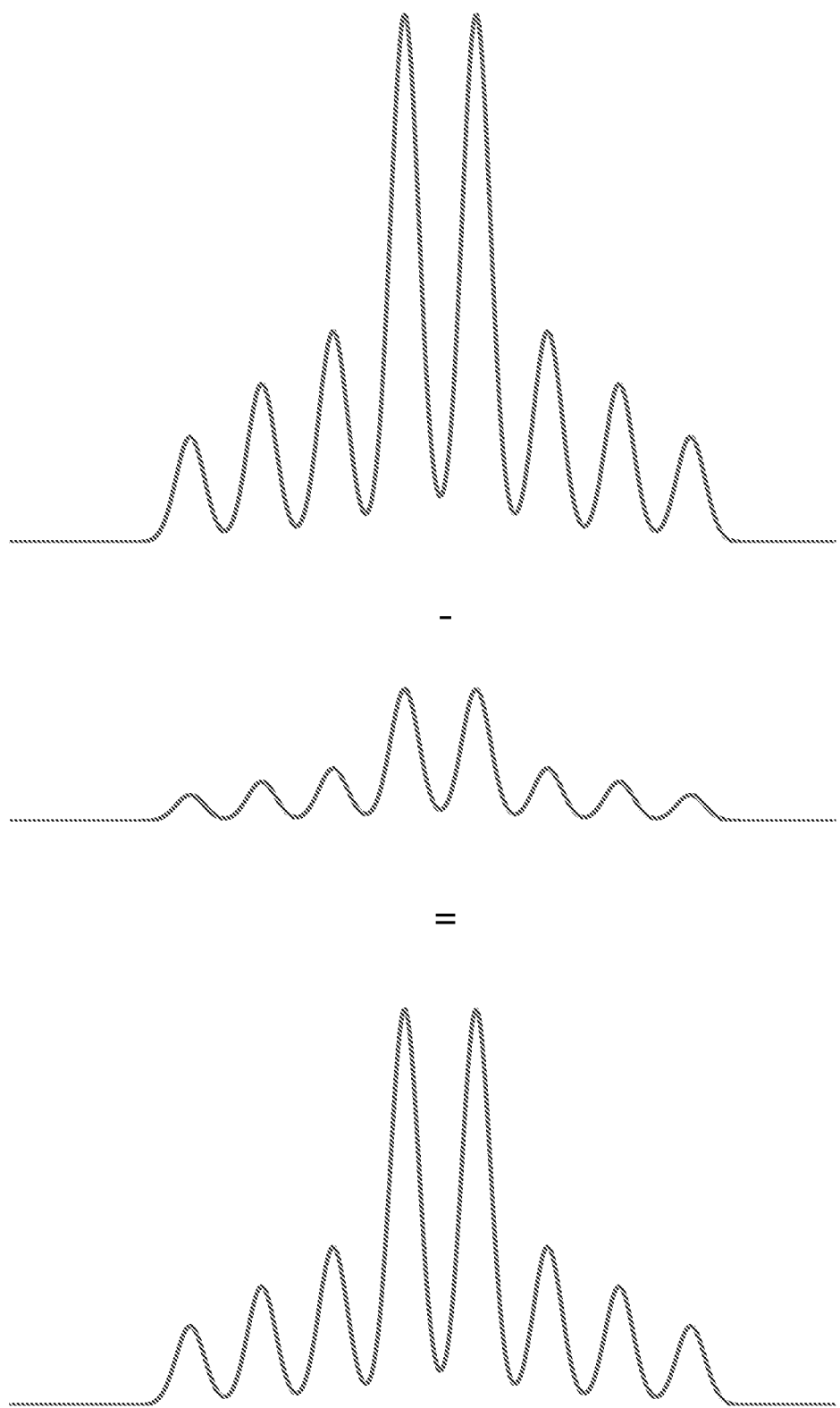
FIG. 3 is an example view of signal combination of a system of an invention embodiment.

In a first configuration, the primary mixer 110 and distortion-source mixer 120 have substantially identical configuration and characteristics (e.g., input-referred third-order intercept point (IIP3), conversion gain, noise floor, frequency response) and substantially identical input signals. In this embodiment, the output of the distortion-source mixer 120 may be attenuated relative to the primary mixer 110 (by the scaler 140) and inverted (by the phase shifter 130) and then combined with the output of the primary mixer no. However, in this invention embodiment, any reduction in distortion in the primary mixer 110 is accompanied by an equal reduction in the desired signal as well, as shown in FIG. 3 (e.g., the desired signal and distortion are both reduced by 12 dB). This configuration is not desirable.

Figure 4:
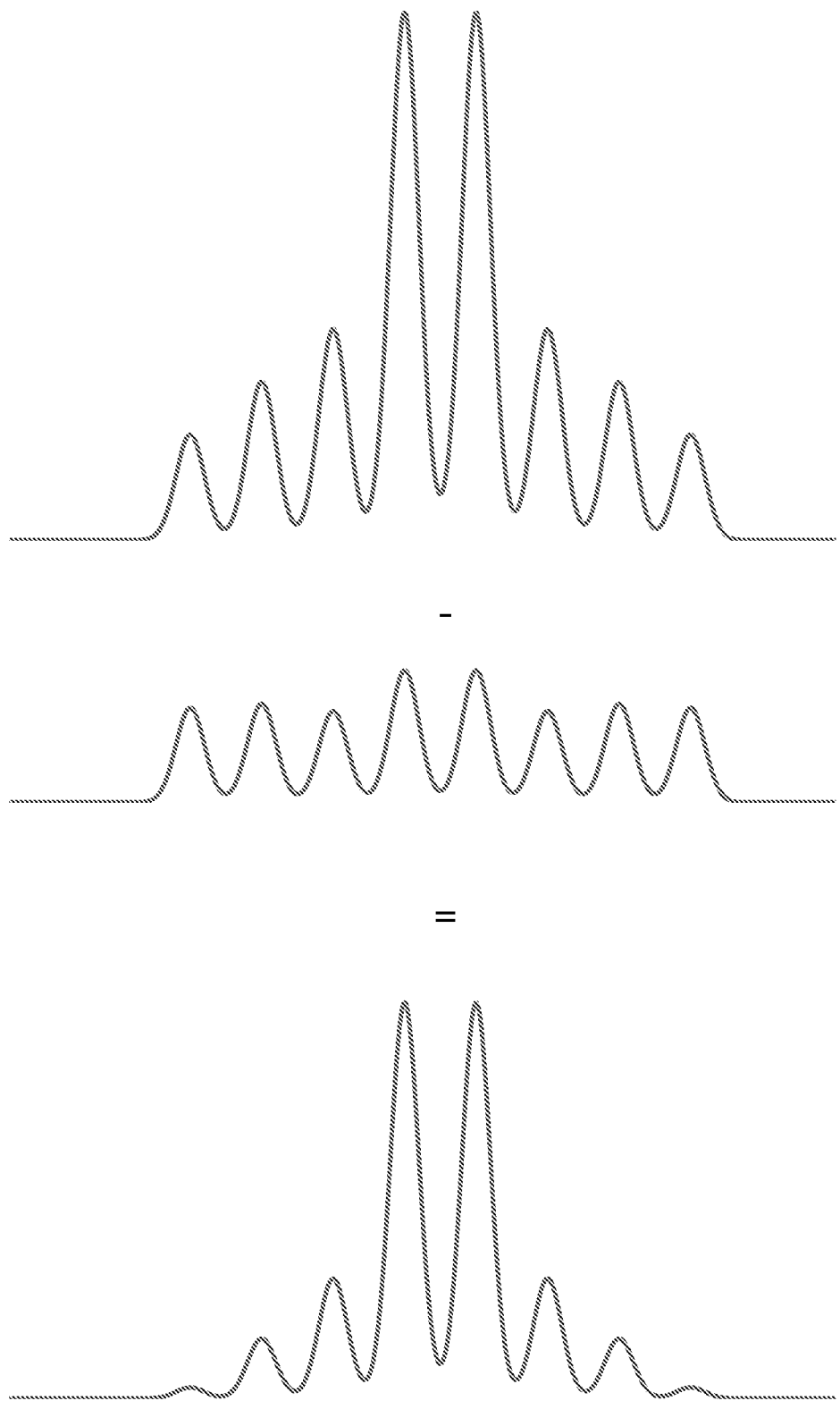
FIG. 4 is an example view of signal combination of a system of an invention embodiment.
Figure 5:
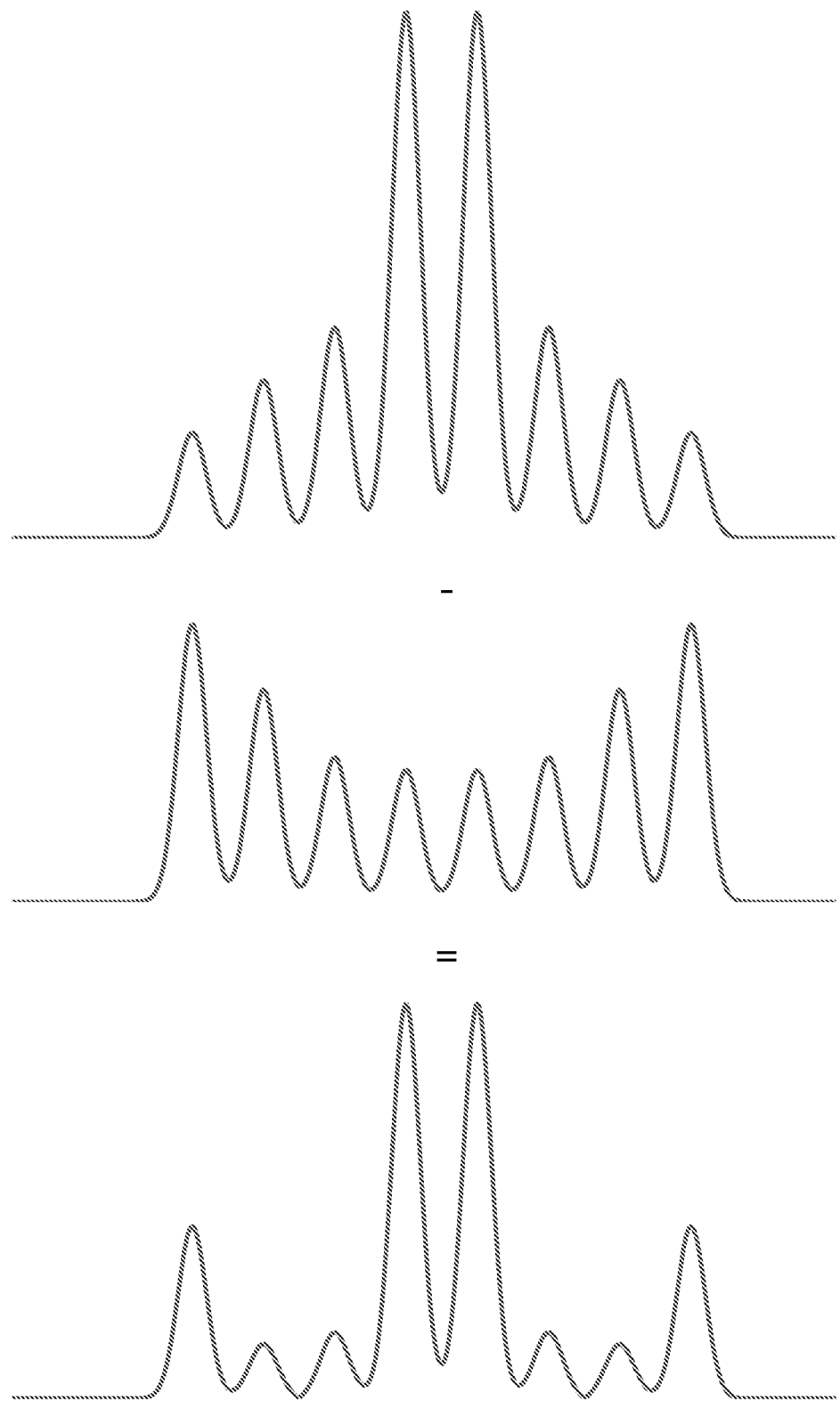
FIG. 5 is an example view of signal combination of a system of an invention embodiment.

In a second configuration, the primary mixer 110 and distortion-source mixer 120 have substantially identical characteristics (e.g., IIP3, conversion gain, noise floor, frequency response), but different input signals. In this configuration, the input signal to the distortion-source mixer 120 has a higher power than that of the primary mixer 110 (by some combination of splitting, attenuation, and/or gain). Because the third order intermodulation products roughly grow with input power to the third order (and so on for fifth and seventh order products), in this configuration, the increased input power means that the signal produced by the distortion-source mixer 120 is more non-linear than that of the primary mixer 110. The output of the distortion-source mixer 120 may then be attenuated (or the primary mixer 110 signal may be amplified) before subtraction. This may be a desirable configuration of the system 100. An example is as shown in FIG. 4. Note that this technique may possibly be limited by the higher order intermodulation products; that is, if the signal (gain) is increased enough on the distortion-source mixer 120 input, it may result in the addition of noise, as shown in FIG. 5.

Note that due to manufacturing variance, substantially similar characteristics may mean that the mixers share identical characteristic specifications (e.g., each characteristic parameter has an identical center value and identical error ranges) but are not actually identical (e.g., both mixers may have an insertion loss of 3 dB plus or minus 0.5 dB, meaning that one mixer could have an insertion loss of 3.1 dB while another has an insertion loss of 2.7 dB).

A variation of the second configuration is using identical input signals but different LO signal levels. When a lower LO level is used for the distortion-source mixer its non-linearity will increase and so will the intermodulation products. The result is similar to the plots shown in FIG. 4 (or FIG. 5).

Both methods described for the second configuration may be combined to optimize linearity, insertion loss, circuit complexity and noise figure.

Figure 6:
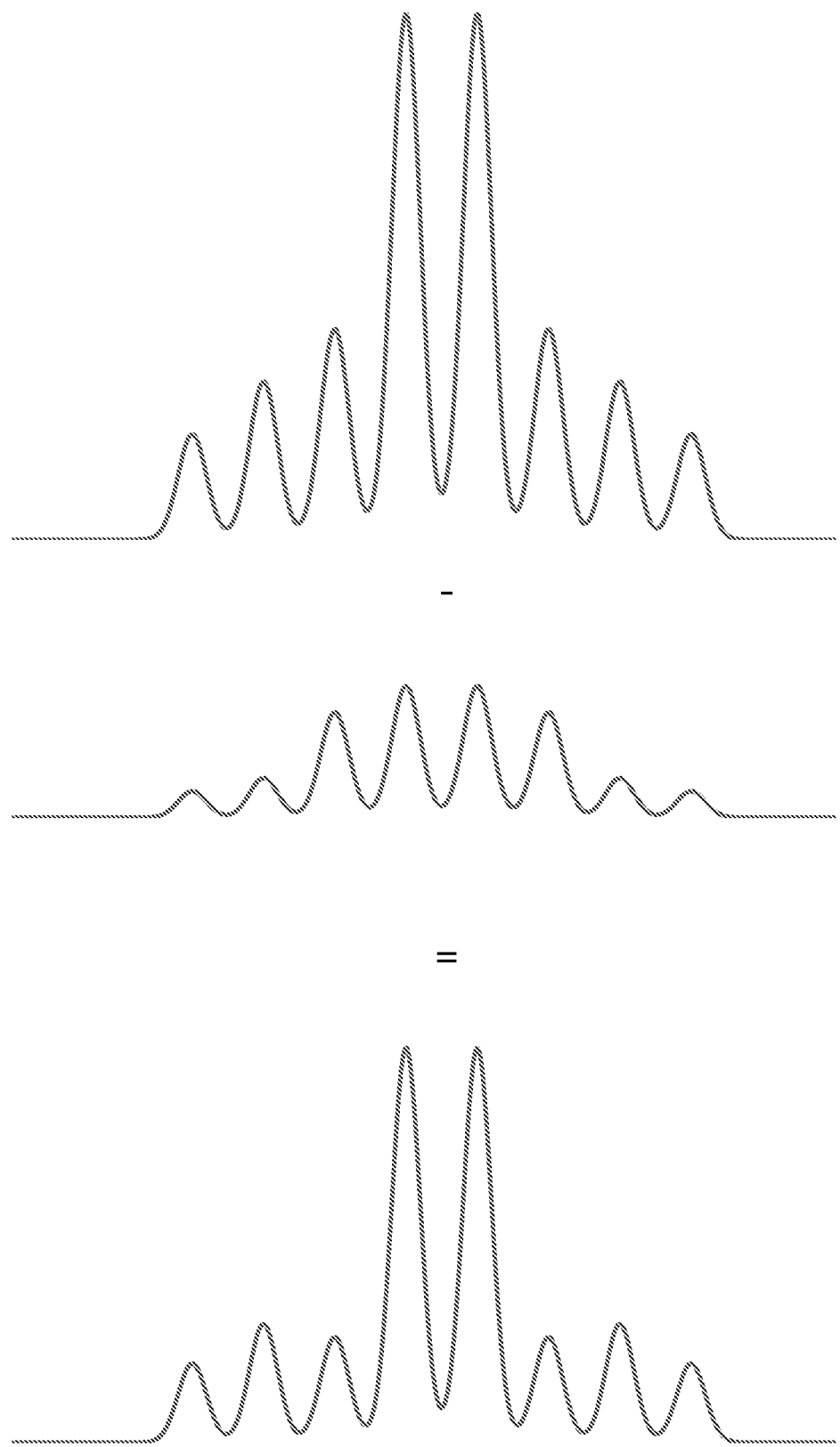
FIG. 6 is an example view of signal combination of a system of an invention embodiment.
Figure 7:
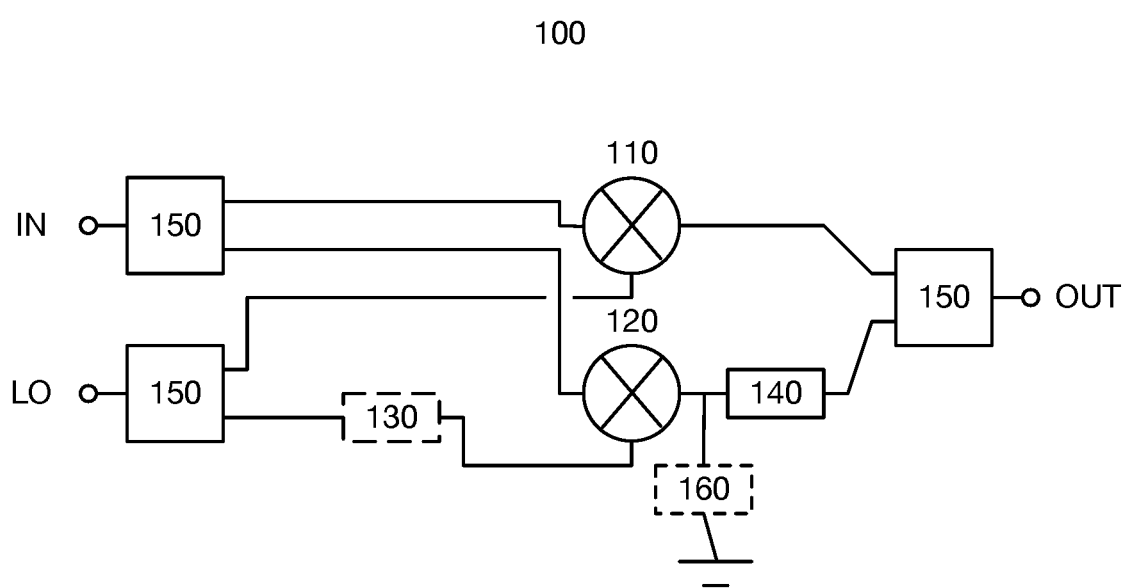
FIG. 7 is a diagram view of a system of an invention embodiment.

In a third configuration, the primary mixer 110 and distortion-source mixer 120 have non-identical configuration and/or characteristics (e.g., IIP3, conversion gain, noise floor, frequency response, operating mode), but substantially identical input signals. For example, the primary mixer 110 and distortion-source mixer 120 may have similar conversion gains and noise floors, but a different IIP3. In this example, the distortion-source mixer 120 preferably exhibits non-linearity similar in form but of a greater magnitude than of the primary mixer 110, allowing for similar effects to the second configuration, but without necessarily suffering the same limitations of the second configuration (e.g., requiring both higher power and a mixer to handle it). In fact, in some mixers, a "low-power" mode enables the mixer to operate at a lower operating power, but with lower IIP3; the system 100 may utilize a primary mixer 110 in "normal mode" and a distortion-source mixer 120 in "low-power" mode in such a scenario. This may be a desirable configuration of the system 100. An example is as shown in FIG. 6.

The system 100 may additionally or alternatively use both mixers 110/120 with non-identical characteristics, non-identical input signals and non-identical LO signals. Mixers 110/120 may be configured in any manner and are not limited to the examples given.

Note that as shown in FIG. 1, the primary mixer 110 and distortion-source mixer 120 share a local oscillator source; additionally or alternatively, the primary mixer 110 and distortion-source mixer 120 may utilize different local oscillator signals.

The phase shifter 130 preferably functions to shift the phase of one of the primary mixer 110 and distortion source mixer 120 such that the output of the distortion source mixer 120 is 180 degrees out of phase with the primary mixer 110 before addition of the signals. Alternatively, the phase shifter 130 may be used for any phase shifting purpose.

The phase shifter 130 may include an impedance matching network at its input and output that compensates for variations in the phase shifter 130 input and output impedance (and/or phase shift amount) due to changes in signal component frequency or simply transforms the impedance to and from a suitable impedance level for the core of the phase shifter to a standardized impedance level (50 ohms). Alternatively, the phase shifter 130 may not include impedance matching networks. The impedance matching networks are preferably tunable (e.g., continuously or discretely variable) but may additionally or alternatively be static (i.e., the impedance transformation achieved by using the network is not variable).

The phase shifter 130 is preferably separated into a set of phase shifting stages. These phase shifting stages preferably may be switched 'on' (e.g., in signal path) or 'off' (e.g., bypassed, out of signal path), depending on control signals. The resulting phase shift is determined by which stages are on and which stages are off; for example, a phase shifter 130 with a 90-degree phase shifting stage and a 10-degree phase shifting stage 'on' might cause a shift of 100 degrees in signal phase.

Each phase shifting stage preferably causes a set amount (i.e., non-variable amount) of phase shift. Alternatively, phase shifting stages may include tunable phase-shift elements. For example, a phase shifting stage may include a varactor; by changing a control voltage of the varactor, the varactor's capacitance (and thus the amount of phase shift experienced by a signal passing through the stage) may be varied.

The phase shifters 130 are preferably controlled by a tuning circuit, but may additionally or alternatively be controlled in any suitable manner.

Note that phase shifters 130 may be located at any point in the system 100; e.g., between the LO and the primary mixer 110 input on the LO signal; between the LO and the distortion-source mixer 120 input on the LO signal; between the system input and the primary mixer 110 input on the input signal; between the system input and the distortion-source mixer 120 input on the input signal; between the primary mixer 110 output and the system output; and/or between the distortion-source mixer 120 output and the system output.

The scaler 140 functions to scale transmit signal components; specifically, the scalers 140 effectively multiply the transmit signal components by a scale factor. For example, an attenuation of 34% might be represented as a scale factor of 0.66; a gain of 20% might be represented as a scale factor of 1.20; and an attenuation of 10% and a phase inversion might be represented as a scale factor of −0.90. Scale factors may be complex; for example, a scale factor of $$e^{\frac{i\pi}{2}}$$

might be represented as a phase shift of ninety degrees.

The scalers 140 may include attenuators, amplifiers, phase inverters, and/or any other suitable components for scaling analog signal components. Attenuators may be resistive attenuators (T pad, Pi pad), amplifiers with less than unity gain, or any other suitable type of attenuator. Amplifiers may be transistor amplifiers, vacuum tube amplifiers, op-amps, or any other suitable type of amplifier. Phase inverters may be any phase inversion devices, including NPN/PNP phase inversion circuits, transformers and/or inverting amplifiers.

The scalers 140 preferably are capable of attenuation, gain, and phase inversion, but may alternatively be capable only of a subset of said capabilities. Each scaler 140 preferably includes all three capabilities in a single device (e.g., an amplifier with tunable gain and two outputs, one inverted and one non-inverted) but may additionally or alternatively separate capabilities into different sections (e.g., an amplifier with tunable gain but no inversion capability, along with a separate phase inversion circuit, an attenuator). The scalers 140 are preferably controlled by a tuning circuit, but may additionally or alternatively be controlled in any suitable manner.

Similarly to phase shifters 130, scalers 140 may be located at any point in the circuit. For example, as shown in FIG. 1, an attenuating scaler 140 may be used to attenuate the output of the distortion-source mixer 120. Additionally or alternatively, an amplifying scaler 140 could be used to amplify the output of the primary mixer no.

Note that in some cases functionality (e.g., in phase inversion) may be accomplished by either or both of the phase shifter 130 and the scaler 140.

Signal couplers 150 function to allow analog signals to be split and/or combined. Signal couplers 150 may couple and/or split signals using varying amounts of power; for example, a signal coupler 150 intended to sample a signal may have an input port, an output port, and a sample port, and the coupler 150 may route the majority of power from the input port to the output port with a small amount coming from the sample port (e.g., a 99.9%/0.1% power split between the output and sample port, or any other suitable split).

The signal coupler 150 is preferably a short section directional transmission line coupler, but may additionally or alternatively be any power divider, power combiner, directional coupler, or other type of signal splitter. The signal coupler 150 is preferably a passive coupler, but may additionally or alternatively be an active coupler (for instance, including gain blocks and power amplifiers). For example, the signal coupler 150 may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler.

For example, a signal coupler 150 may split an input-source signal (the input to the system 100) into two input signals, one of which will serve as input to the primary mixer 110 (primary-mixer-input signal) and one of which will serve as input to the distortion-source mixer 120 (distortion-mixer-input signal). Likewise, another signal coupler 150 may split a local oscillator signal into two signals, one of which will serve as the LO signal for the primary mixer 110 (primary-mixer-LO signal) and one of which will serve as the LO signal to the distortion-source mixer 120 (distortion-mixer-LO signal).

Harmonic shorting circuits 160 function to reduce the contribution of harmonics to the output of the system 100 (and thus function to increase linearity of the output). Harmonic shorting circuits are preferably series LC resonators tuned to resonance at a specific harmonic frequency (e.g., 3f, 5f), but may additionally or alternatively be any circuit capable of shorting a signal path of the system 100 at a specific desired frequency. Similar to phase shifters 130 and scalers 140, harmonic shorting circuits 160 may be placed at any point in the system 100. For example, a third harmonic short may be placed in the output path of the distortion-source mixer 120 (which reduces the presence of fifth-order intermodulation (IM5) and/or seventh-order intermodulation (IM7) products in the output of the distortion source mixer 120 and prevents a growth of these components after subtraction as shown in FIG. 5). A harmonic shorting circuit 160 may additionally or alternatively be placed at the input or output of the primary mixer 110, at the output of the distortion-source mixer 120, or at any other location. Note that multiple harmonic shorting circuits 160 may be placed in parallel (or otherwise may be located in the system 100) to reduce the presence of harmonics at multiple frequencies.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for enhanced linearity mixing. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for enhanced linearity mixing, comprising:
   an input coupler comprising: an input coupler input, a first coupler output, and a second coupler output; wherein the input coupler receives a first input signal at the input coupler input and splits the first input signal into a primary-mixer-input signal and a distortion-source-input signal;
   a primary frequency mixer comprising: a primary mixer signal input that receives the primary-mixer-input signal from the first coupler output; a primary mixer local oscillator (LO) input that receives a primary-mixer-LO signal defining a first frequency; and a primary mixer output that outputs a primary-mixer-output signal, the primary-mixer-output signal comprising a first-order primary-mixer-output signal component and a higher-order primary-mixer-output signal component, wherein:
      the primary frequency mixer generates the primary-mixer-output signal by heterodyning the primary-mixer-input signal with the primary-mixer-LO signal; and
      the primary-mixer-output signal defines a first signal power ratio of the higher-order primary-mixer-output signal component divided by the first-order primary-mixer-output signal component;
   a distortion-source frequency mixer comprising: a distortion-source mixer signal input that receives the distortion-source-mixer-input signal from the second coupler output; a distortion-source mixer LO input that receives a distortion-source-mixer-LO signal defining the first frequency; and a distortion-source mixer output that outputs a distortion-source-mixer-output signal, the distortion-source-mixer-output signal comprising a first-order distortion-source-mixer-output signal component and a higher-order distortion-source-mixer-output signal component, wherein:
      the distortion-source frequency mixer generates the distortion-source-mixer-output signal by heterodyning the distortion-source-mixer-input signal with the distortion-source-mixer-LO signal;
      the distortion-source-mixer-output signal defines a second signal power ratio of the higher-order distortion-source-mixer-output signal component divided by the first-order distortion-source-mixer-output signal component; and
      the second signal power ratio is greater than the first signal power ratio; and
   an output coupler comprising: a first coupler input that receives the primary-mixer-output signal from the primary mixer output; a second coupler input the receives the distortion-source-mixer-output signal from the distortion-source mixer output; and an output coupler output that outputs an output signal, the output signal comprising a first-order output signal component and a higher-order output signal component, wherein:
the output coupler generates the output signal by combining the primary-mixer-output signal with the distortion-source-mixer-output signal;
the output signal defines a third signal power ratio of the higher-order output signal component divided by the first-order output signal component; and
the third signal power ratio is less than the first signal power ratio.

2. The system of claim 1, further comprising an LO coupler comprising: an LO coupler input, a first LO output, and a second LO output; wherein:
the LO coupler receives an LO signal at the LO coupler input and splits the LO signal into the primary-mixer-LO signal and the distortion-source-mixer-LO signal;
the primary mixer LO input receives the primary-mixer-LO signal from the first LO output; and
the distortion-source mixer LO input receives the distortion-source-mixer-LO signal from the second LO output.

3. The system of claim 1, wherein, at the output coupler, the primary-mixer-output signal is inverted relative to the distortion-source-mixer-output signal.

4. The system of claim 3, further comprising a set of phase shifters that phase shift at least one of: the primary-mixer-input signal, the distortion-source-mixer-input-signal, the primary-mixer-LO signal, the distortion-source-mixer-LO signal, the primary-mixer-output signal, or the distortion-source-mixer-output signal, such that the primary-mixer-output signal is inverted relative to the distortion-source-mixer-output signal.

5. The system of claim 4, wherein the set of phase shifters consists of a single phase shifter.

6. The system of claim 1, wherein the distortion-source mixer and primary mixer have non-identical characteristic specifications.

7. The system of claim 1, wherein the distortion-source mixer and primary mixer have different input-referred third-order intercept point values.

8. The system of claim 1, wherein a distortion-source-mixer-input signal power of the distortion-source-mixer-input signal is substantially greater than a primary-mixer-input signal power of the primary-mixer-input signal.

9. The system of claim 8, further comprising:
a first scaler that amplifies the distortion-source-mixer-input signal; and
a second scaler that attenuates the distortion-source-mixer-output signal.

10. The system of claim 1, further comprising a harmonic shorting circuit that shorts a harmonic signal component to ground, wherein one of the primary-mixer-input signal, the primary-mixer-output signal, the distortion-source-mixer-input signal, or the distortion-source-mixer-output signal comprises the harmonic signal component.

11. The system of claim 10, wherein the harmonic signal component is a third-order intermodulation product.

12. The system of claim 11, wherein the harmonic shorting circuit further shorts one of a fifth-order intermodulation product and or a seventh-order intermodulation product to ground.

13. A system for enhanced linearity mixing, comprising:
a radio frequency (RF) input coupler comprising: an RF coupler input, a first RF output, and a second RF output;
a primary frequency mixer comprising:
a primary mixer signal input coupled to the first RF output;
a primary mixer local oscillator (LO) input; and
a primary mixer intermediate frequency (IF) output, wherein the primary frequency mixer is configured to output a first IF signal at the primary mixer IF output;
a distortion-source frequency mixer comprising:
a distortion-source mixer signal input coupled to the second RF output;
a distortion-source mixer LO input; and
a distortion-source mixer IF output, wherein the distortion-source frequency mixer is configured to output a second IF signal at the distortion-source frequency mixer such that intermodulation distortion in the second IF signal is substantially greater than intermodulation distortion in the first IF signal; and
an IF coupler comprising:
a first IF input coupled to the primary mixer IF output;
a second IF input coupled to the distortion-source mixer IF output; and
an IF coupler output, wherein the IF coupler is configured to combine the first and second IF signals, thereby reducing intermodulation distortion at the IF coupler output as compared with the first IF input and as compared with the second IF input.

14. The system of claim 13, further comprising an attenuator coupled between the distortion-source mixer IF output and the second IF input.

15. The system of claim 14, wherein:
the first IF signal comprises a first intermodulation distortion component at a first frequency, the first intermodulation distortion component having a first amplitude;
the second IF signal comprises a second intermodulation distortion component at the first frequency; and
the attenuator is configured to attenuate the second IF signal such that the second intermodulation distortion component has a second amplitude substantially equal to the first amplitude.

16. The system of claim 13, further comprising a local oscillator (LO) coupler comprising:
an LO coupler input;
a first LO output coupled to the primary mixer LO input; and
a second LO output coupled to the distortion-source mixer LO input.

17. The system of claim 16, further comprising a phase shifter coupled between one of:
the first RF output and the primary mixer signal input;
the second RF output and the distortion-source mixer signal input;
the first LO output and the primary mixer LO input;
the second LO output and the distortion-source mixer LO input;
the primary mixer IF output and the first IF input; or
the distortion-source mixer IF output and the second IF input.

18. The system of claim 17, wherein the phase shifter is a phase inverter.

19. The system of claim 16, wherein the distortion-source mixer and primary mixer have different input-referred third-order intercept point (IIP3) values, wherein the IIP3 value of the distortion-source mixer is substantially less than the IIP3 value of the primary mixer.

20. The system of claim 16, further comprising a harmonic shorting circuit coupling one of the primary frequency mixer and or the distortion-source frequency mixer to ground.

21. The system of claim 20, wherein the harmonic shorting circuit comprises an LC resonator that couples one of the primary frequency mixer and or the distortion-source frequency mixer to ground.

22. The system of claim 21, wherein the LC resonator defines a resonance frequency substantially equal to one of: a third-order harmonic frequency, a fifth-order harmonic frequency, or a seventh-order harmonic frequency.

23. The system of claim 20, wherein the harmonic shorting circuit couples the primary mixer signal input to ground.

* * * * *